W. H. EDDY.
FIRE HOSE VALVE.
APPLICATION FILED JAN. 7, 1916.

1,229,245.

Patented June 12, 1917.
3 SHEETS—SHEET 1.

Witnesses
Frederick W. Ely,

Inventor
William H. Eddy.
By Victor J. Evans
Attorney

W. H. EDDY.
FIRE HOSE VALVE.
APPLICATION FILED JAN. 7, 1916.

1,229,245.

Patented June 12, 1917.
3 SHEETS—SHEET 2.

Witnesses

Inventor
William H. Eddy.
By Victor J. Evans
Attorney

W. H. EDDY.
FIRE HOSE VALVE.
APPLICATION FILED JAN. 7, 1916.

1,229,245.

Patented June 12, 1917.
3 SHEETS—SHEET 3.

Witnesses
Frederick W. Ely
J. W. Gardner

Inventor
William H. Eddy.

By Victor J. Evans
Attorney.

UNITED STATES PATENT OFFICE.

WILLIAM H. EDDY, OF SUPERIOR, WISCONSIN.

FIRE-HOSE VALVE.

1,229,245.

Specification of Letters Patent.

Patented June 12, 1917.

Application filed January 7, 1916. Serial No. 70,849.

*To all whom it may concern:*

Be it known that I, WILLIAM H. EDDY, a citizen of the United States, residing at Superior, in the county of Douglas and State of Wisconsin, have invented new and useful Improvements in Fire-Hose Valves, of which the following is a specification.

This invention is an improved fire hose valve, the object of the invention being to provide an improved valve for use in connection with a fire hose in a building and which is kept normally closed by the water pressure; is provided with a controlling valve which is automatically operated by the hose, when taking the latter down from the rack for use in the event of fire; which is not liable to stick and to be thereby rendered inoperative; and which also utilizes the water pressure to cause the valve to open and admit water to the hose when the controlling valve is operated by the taking down of the hose.

The invention consists in the construction combination and arrangement of devices hereinafter described and claimed.

In the accompanying drawings.

Figure 1:
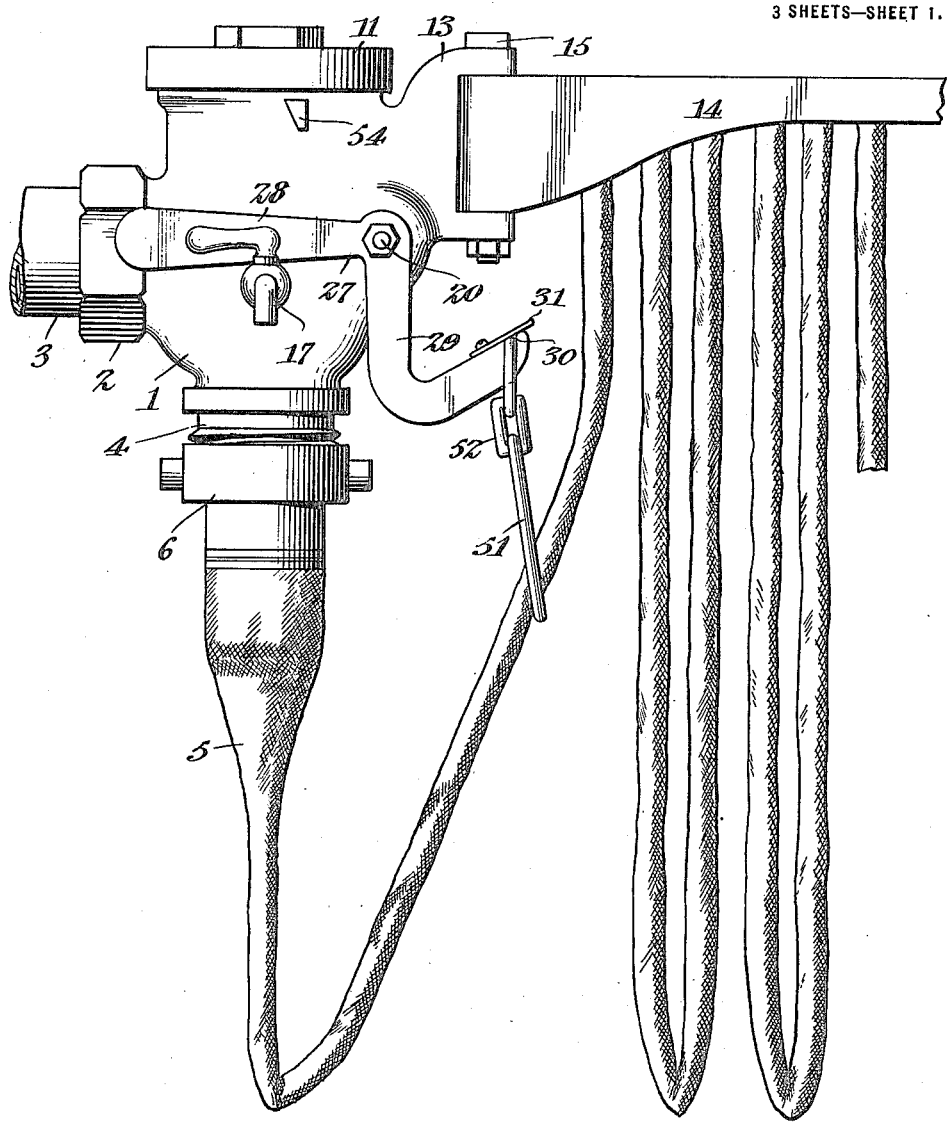
Figure 1 is an elevation of a fire hose valve constructed in accordance with my invention and showing the same in operative relation to a fire hose, and a rack for the hose.

In accordance with my invention, I provide a valve case 1 which has an arm 2 at one side to which a water pipe 3 is screwed and the said casing also has a downwardly extending outlet arm 4 at its lower side to which the fire hose 5 is connected by a coupling 6. Around the upper end of the outlet arm 4 is a valve seat 7. The valve casing is further provided with a vertical cylindrical bore 8 at the upper end of the outlet arm 4 to communicate with the latter, a passage 9 being formed in the arm 2 to establish communication between the said water pipe 3, said bore 8, and the discharge arm 4, and above the bore 8 and communicating therewith is a larger bore which forms a closing chamber 10. A cap 11 is screwed to the upper side of the casing, forms a closure for the chamber 10 and is provided with a gasket 12. At the side of the valve casing opposite the inlet arm 2 is a supporting arm 13 to which a rack 14, to carry the fire hose, is attached by means of a bolt 15 as shown.

A drainage duct 16 leads from the bottom of the chamber 10 to a drainage valve 17 which is secured as at 18 to one side of the casing. The casing also has a transverse bore 19 in which a controlling valve 20 which is here shown as a plug valve, is mounted for turning movement, said valve tapering in one direction and being provided at its smaller end with a threaded projection 21 which receives a nut 22 and washer 23 that detachably holds the valve in place. At the opposite end of the valve is a squared portion 24 and threaded portion 25. Said squared portion passes through an angular opening 26 in a lever 27 which is here shown as having a handle arm 28 and a bent arm 29 arranged at an angle to said handle arm and provided on its upper side near its outer end with a notch 30 and with a spring 31 to close said notch.

A groove or duct 32 extends around the wall of the bore 8. A passage 33 leads from the duct or passage 32 to the bore 19. This passage 33 is broad. A passage 34 leads from the bore 19 to the lower end of the chamber 10. A passage 35 leads from said bore to the upper end of said chamber. A passage 36 leads from said bore to the outlet arm 4.

The controlling valve plug 19 has a segmental port 37 which communicates with the passage 35 and also has radially arranged ports 38, 39 which communicate with said port 37 and each other and are so spaced at their outer ends that when the port 38 is in communication with the passage 32, the port 39 will be out of communication with the port 36. The said controlling valve plug 19 also has radially arranged ports 40, 41 which communicate with each other and are so arranged that when the port 38 is in communication with the passage 33, the port 40 will be in communication also with said passage 33 and out of communication with the passage 34.

A cylindrical plunger 42 is formed with a smaller member 43 which operates in the smaller bore 8 and a diametrically larger upper member 44 which operates in the cylindrical chamber 10 and is spaced from the upper end of said member 43 as at 45, said members being connected together by a centrally arranged rod or stem 46 and the lower member 43 being provided with a downwardly extending and threaded stem 47 on which is mounted a valve disk 48, of rubber or other suitable material and which is normally engaged on the seat 7 and is held on said stem by a nut 49 and a washer 50.

The hose 5, near its inner end, passes through a link 51 which is provided with links 52, one of which is engaged on the arm 29 of the lever 27 and in the notch 30.

Figure 2:
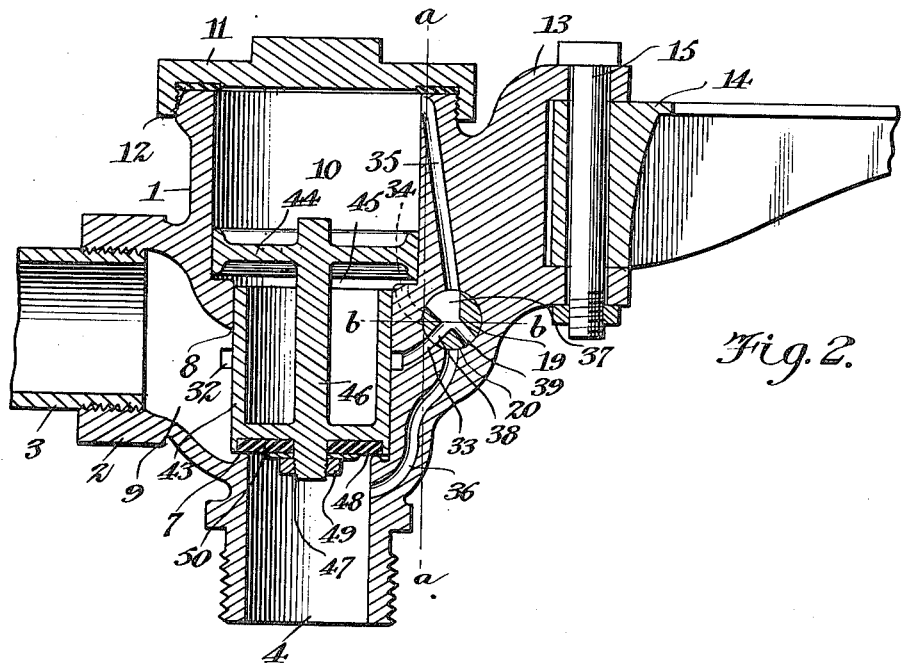
Fig. 2 is a vertical central sectional view of the same.
Figure 3:
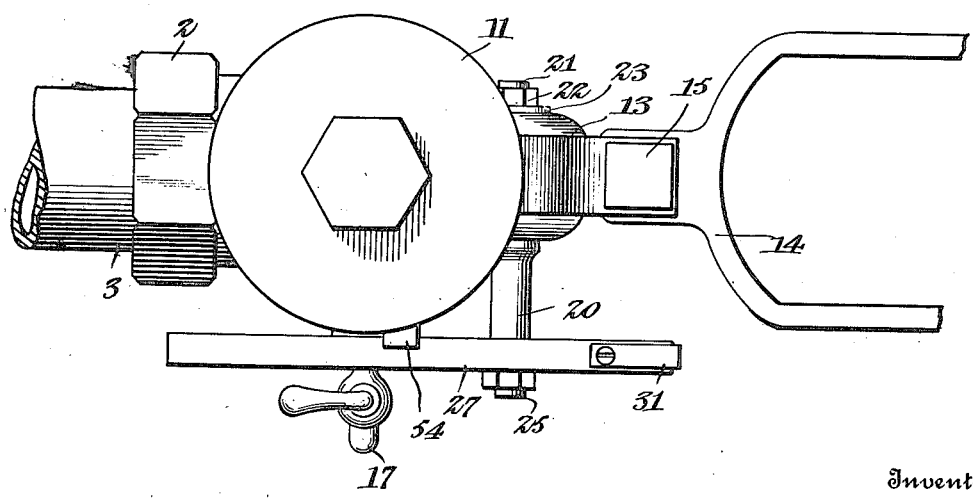
Fig. 3 is a plan of the same.
Figure 4:
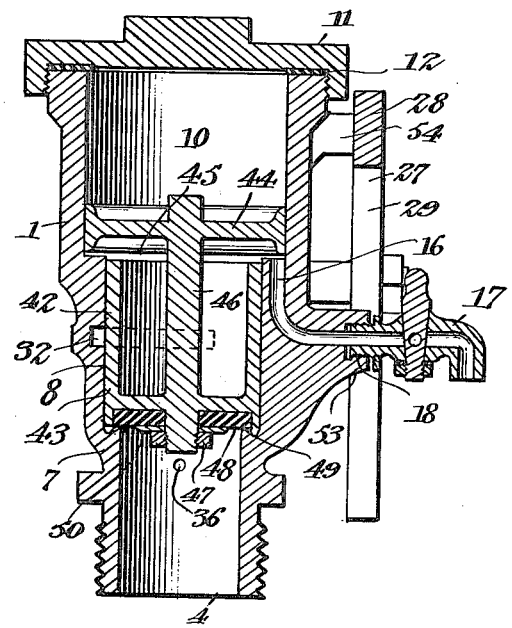
Fig. 4 is a vertical central sectional view of the same on a plane at right angles to that of Fig. 2.
Figure 5:
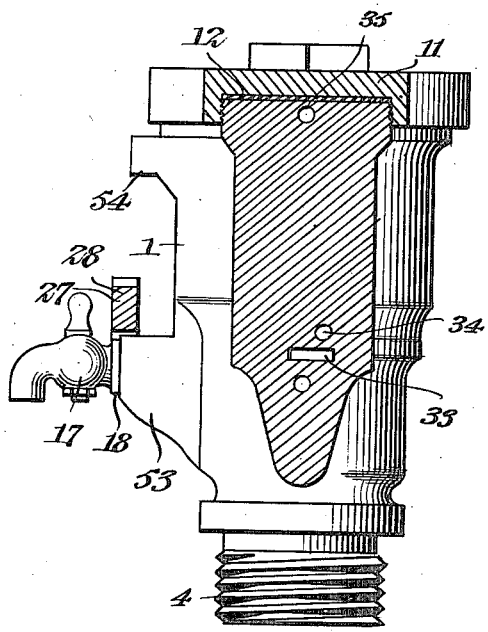
Fig. 5 is a similar view on the plane indicated by the line *a—a* of Fig. 2.
Figure 6:
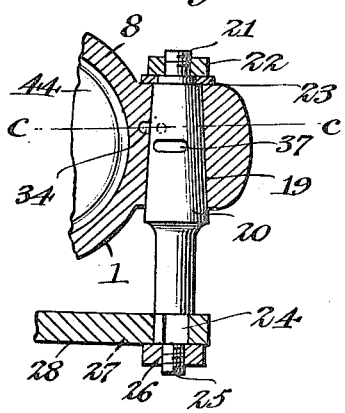
Fig. 6 is a detail sectional view on the plane indicated by the line *b—b* of Fig. 2.
Figure 7:
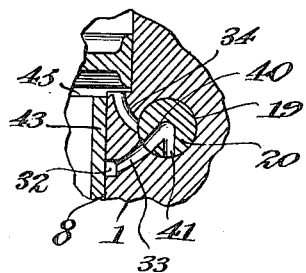
Fig. 7 is a detail vertical sectional view on the plane indicated by the line *c—c* of Fig. 2.

The normal position of the controlling valve plug is as hereinbefore described and as shown in Fig. 2 and normally, the plunger is in lowered position, with the valve disk 48 bearing on the seat 7 and cutting off communication between the water inlet 3 and the water outlet 4. Communication is normally maintained, however, between the passage 9 and the closing chamber 10, through the duct 32, passage 33, ports 38, 37, and passage 35, and hence the water pressure is exerted downwardly on the upper plunger member 44 and the plunger and valve disk are maintained by water pressure in closed position.

In the event of a fire, the hose is taken down from the rack and pulled in the required direction and such movement of the hose causes the links 51, 52, to draw downwardly on the arm 29 of the lever 27 and thus partly turn the controlling valve plug 19, thus causing its port 38 to move out of registry with the passage 33 and its port 39 to move into registry with the passage 36. Such motion of the controlling valve plug also causes the port 40 to move into registry with the passage 34 and the port 41 to move into registry with the passage 33. Hence communication between the passage 37 and the closing chamber 10 is cut off and communication is established between the passage 9 and the lower end of the chamber 10 through the space between the members 43, 44 of the plunger and through the duct 32, passage 33, port 41, port 40, and passage 34, as will be understood, and communication is also established between the chamber 10 and the outlet 4 through the passage 35, ports 37, 39 and passage 36. Hence pressure is relieved in the chamber 10, above the plunger and the latter is forced upwardly by the water pressure, causing the valve disk 48 to be carried upwardly from the seat 7 so that communication is established between the inlet and outlet of the valve casing and the full water pressure is hence admitted to the hose. The draw out of the hose causes the link 52 to be disengaged from the notch 30 so that the links 51, 52 drop to the floor with the hose. The link 51 is of such size as to enable the hose to expand as the water enters the same. To close the valve, the lever 27 must be turned manually to restore the controlling valve plug 19 to the initial position hereinbefore described. The chamber 10 may be drained when desired by opening the drain valve 17. The water may be turned on either gradually or suddenly and the valve will remain closed. The water, (or if the pipe lines are perfectly tight) only air will reach the valve through the passages hereinbefore described and apply the pressure directly on the plunger, thus holding the valve closed.

My improved fire hose valve is always in condition for operation, may be readily opened either by pulling the hose or by manually actuating the lever 27 and is not liable to stick or fail to operate.

Stops 53, 54 are provided on the casing 1 to coact with the lever arm 28 and limit the movement of the controlling valve and facilitate and assure the proper positioning of the controlling valve to close or open the hose valve as desired.

I would have it understood that changes may be made in the form proportion and construction of the several parts without departing from the spirit of my invention and within the scope of the appended claim. I would also have it understood that the valve may be used for other purposes than in connection with a fire hose and the valve casing may, within the scope of the invention be manufactured without the hose supporting arm and with an outlet arm other than a hose connection.

Having described the invention, what is claimed is:

In a valve of the class described a valve casing having inlet and outlet members, a cylindrical bore with which the inlet and outlet members communicate, a pressure chamber of greater diameter than and communicating with one end of the cylindrical bore, the casing being further provided with a duct around the wall of said bore, a passage leading from said duct, a transverse bore to which said passage extends, a passage leading from said transverse bore to the outlet, a passage leading from said bore to the upper end of the pressure chamber, a passage leading from said bore to the lower end of the pressure chamber, a valve shaped to fit in the first named bore of the casing and movable to open and to close the outlet, a pressure actuated member connected to the valve and arranged for operation in the pressure chamber, and a controlling valve mounted for turning movement in the transverse bore, said controlling valve having a segmental port in constant communication with the passage which leads to the upper end of the pressure chamber, a port to connect said port with the passage leading to the outlet, a port to connect said segmental port with the passage leading from the duct and also having a pair of connected ports to establish communication between said duct and the first named passage when said valve is turned to establish communication between the upper end of the pressure chamber and the outlet.

In testimony whereof I affix my signature in presence of two witnesses.

WILLIAM H. EDDY.

Witnesses:
R. M. RIESER,
IRENE O'BRIEN.